(12) United States Patent
Tani et al.

(10) Patent No.: US 8,452,596 B2
(45) Date of Patent: May 28, 2013

(54) SPEAKER SELECTION BASED AT LEAST ON AN ACOUSTIC FEATURE VALUE SIMILAR TO THAT OF AN UTTERANCE SPEAKER

(75) Inventors: Masahiro Tani, Tokyo (JP); Tadashi Emori, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 799 days.

(21) Appl. No.: 12/593,414

(22) PCT Filed: Feb. 29, 2008

(86) PCT No.: PCT/JP2008/053629
§ 371 (c)(1),
(2), (4) Date: Sep. 28, 2009

(87) PCT Pub. No.: WO2008/117626
PCT Pub. Date: Oct. 2, 2008

(65) Prior Publication Data
US 2010/0114572 A1 May 6, 2010

(30) Foreign Application Priority Data
Mar. 27, 2007 (JP) ................. 2007-082230

(51) Int. Cl.
*G10L 17/00* (2006.01)
(52) U.S. Cl.
USPC ........................................... 704/247
(58) Field of Classification Search
USPC ........................................... 704/247
See application file for complete search history.

(56) References Cited

FOREIGN PATENT DOCUMENTS

| JP | 10-319988 A | 12/1998 |
|---|---|---|
| JP | 2000250593 A | 9/2000 |
| JP | 2003202891 A | 7/2003 |
| JP | 2004053821 A | 2/2004 |
| JP | 2004294755 A | 10/2004 |
| JP | 3756879 B | 1/2006 |

OTHER PUBLICATIONS

International Search Report for PCT/JP2008/053629 mailed May 27, 2008.
H. Zheng et al., "Two-stage Decision for Short Utterance Speaker Identification in Mobile Telecommunication Environment", Proceedings of the 2004 IEEE International Conference on Systems, Man and Cybernetics, Oct. 10, 2004, vol. 1, p. 547-551.
S. Yoshizawa et al., "Unsupervised Phoneme Model Training Based on the Sufficient HMM Statistics from Selected Speakers", The transactions of the Institute of Electronics, Information and Communication Engineers, Mar. 1, 2002, vol. J85-D-II, No. 3, pp. 382 to 389.
A.G. Adams et al., "Modeling Prosodic Dynamics For Speaker Recognition", Proceedings of the 2003 IEEE International Conference on Acoustics, Speech, and Signal Processing, Apr. 6, 2003, vol. 4, p. IV-788-IV-791.

*Primary Examiner* — Susan McFadden

(57) ABSTRACT

To enable selection of a speaker, the acoustic feature value of which is similar to that of an utterance speaker, with accuracy and stability, while adapting to changes even when the acoustic feature value of the speaker changes every moment, a long-time speaker score is calculated (log likelihood of each of a plurality of speaker models stored in a speaker model storage with respect to the acoustic feature value) based on an arbitrary number of utterances, for example, and a short-time speaker score is calculated based on a short-time utterance, for example. Speakers are selected corresponding to a predetermined number of speaker models having a high long-time speaker score. Speakers are selected corresponding to the speaker models, the number of which is smaller than the predetermined number and the short-time speaker sore of which is high, from among the speakers having a high long-time speaker score.

21 Claims, 14 Drawing Sheets

```
31 SPEAKER MODEL STORAGE SECTION
```

SPEAKER ID : 0001

NUMBER OF STATES : 1
  NUMBER OF MIXED DISTRIBUTIONS: 64
  MIXTURE WEIGHT 1: 1.688952e-03
  MEAN : -5.341367e+02, -1.453158e+03, ···
  VARIANCE : 1.222123e+06, 7.483611e+05, ···
  MIXTURE WEIGHT 2: 1.552107e-02
  MEAN : -4.921964e+01, -3.625431e+02, ···
  VARIANCE : 1.498879e+06, 1.139137e+06, ···
    :
    :
  MIXTURE WEIGHT 64: 4.090221e-03
  MEAN : -1.285163e+03, -1.678903e+03, ···
  VARIANCE : 1.680939e+05, 9.945057e+04, ···

SPEAKER ID : 0002
    :
    :
SPEAKER ID : 3120
    :
    :

Fig. 12

SPEAKER SCORE (LOG LIKELIHOOD)

| SPEAKER ID | SPEAKER SCORE |
|---|---|
| 0001 | -5.087164e+06 |
| 0002 | -5.084568e+06 |
| 0003 | -5.095303e+06 |
| 0004 | -5.080867e+06 |
| 0005 | -5.122141e+06 |
| ⋮ | ⋮ |
| 3120 | -5.085164e+06 |

Fig. 13

SPEAKER SELECTION BASED AT LEAST ON AN ACOUSTIC FEATURE VALUE SIMILAR TO THAT OF AN UTTERANCE SPEAKER

CROSS-REFERENCE TO RELATED APPLICATIONS

This application is the National Phase of PCT/JP2008/053629, filed Feb. 29, 2008, which is based upon and claims priority from Japanese Patent Application No. 2007-082230, filed Mar. 27, 2007, which is incorporated herein in its entirety by reference.

TECHNICAL FIELD

The present invention relates to a speaker selecting device, a speaker adaptive model creating device, a speaker selecting method, and a speaker selecting program. In particular, the present invention relates to a speaker selecting device for selecting a speaker, the acoustic feature value of which is similar to that of an utterance speaker, a speaker adaptive model creating device, a speaker selecting method, and a speaker selecting program.

BACKGROUND ART

As an example of devices for creating a speaker adaptive model for use in voice recognition processing and the like, there is known a device for selecting a speaker model, the acoustic feature value of which is similar to that of an utterance speaker, from among a large number of speaker models prestored in a storage unit, and for creating a speaker adaptive model for the utterance speaker based on the selected speaker model. An example of a speaker selecting device in such a speaker adaptive model creating device is disclosed in Non Patent Document 1 and Patent Document 1. Note that selecting a speaker model, the acoustic feature value of which is similar to that of the utterance speaker, is hereinafter referred to as "selecting a speaker" or "speaker selection". Further, the "speaker adaptive model" is also referred to as an "adaptive model".

An adaptive model creating method employed in the speaker adaptive model creating device disclosed in Non Patent Document 1 includes selecting a speaker, the acoustic feature value of which is similar to that of the utterance speaker, and creating a phoneme model adapted to the utterance speaker by using the sufficient statistic of the selected speaker, and the method consists mainly of three steps.

First, a sufficient statistic relating to an HMM (Hidden Markov Model) for each speaker is calculated and accumulated. The sufficient statistic refers to a statistic sufficient to represent the nature of a database, which includes the mean, variance, and EM count of a phoneme model described by an HMM in the method disclosed in Non Patent Document 1. The EM count refers to the probabilistic frequency of transition from a state i to a state j of a Gaussian distribution k in an EM algorithm. The sufficient statistic is calculated by one-time learning from an unspecified speaker model in the EM algorithm by use of voice data for each speaker.

Next, a speaker, the acoustic feature value of which is similar to that of the utterance speaker, is selected using a speaker model described by a GMM (Gaussian Mixture Model: probabilistic model of observed data described by mixture gaussian distribution). Specifically, the top N number of speakers having a high acoustic likelihood, which is obtained by inputting an input voice to the speaker model, are selected. Note that selection of speakers is equivalent to selection of sufficient statistics corresponding to the speakers. In the method disclosed in Non Patent Document 1, a speaker model is created in advance using a 1-state 64-mixture GMM without distinction of the phoneme. Further, a value N is empirically determined, and one arbitrary utterance is used as adaptive data.

Lastly, a phoneme model adapted to the utterance speaker is created through statistical processing using the sufficient statistics corresponding to the speakers selected using the speaker model.

[Equation 1]

$$\mu_i^{adp} = \frac{\sum_{j=1}^{N_{sel}} C_{mix}^j \mu_i^j}{\sum_{j=1}^{N_{sel}} C_{mix}^j} (i = 1, 2, \ldots, N_{mix}) \quad \text{(Equation 1)}$$

[Equation 2]

$$v_i^{adp} = \frac{\sum_{j=1}^{N_{sel}} C_{mix}^j (v_i^j + (\mu_i^j)^2)}{\sum_{j=1}^{N_{sel}} C_{mix}^j} - (\mu_i^{adp})^2 (i = 1, 2, \ldots, N_{mix}) \quad \text{(Equation 2)}$$

[Equation 3]

$$a^{adp}[i][j] = \frac{\sum_{k=1}^{N_{sel}} C_{state}^k[i][j]}{\sum_{j=1}^{N_{state}} \sum_{k=1}^{N_{sel}} C_{state}^k[i][j]} (i, j = 1, 2, \ldots, N_{state}) \quad \text{(Equation 3)}$$

where, $\mu_i^{adp}$ (i=1, ..., $N_{mix}$) and $v_i^{adp}$ (i=1, ..., $N_{mix}$) respectively represent the mean and variance of a Gaussian distribution in each state of the HMM of the adaptive model, and $N_{mix}$ represents the number of mixed distributions. Further, $a^{adp}[i][j]$ (i, j=1, ..., $N_{state}$) represents the transition probability from a state i to a state j, and $N_{state}$ represents the number of states. $N_{sel}$ represents the number of selected speakers, and $\mu_i^j$ (i=1, ..., $N_{mix}$, j=1, ..., $N_{sel}$) and $v_i^j$ (i=1, ..., $N_{mix}$, j=1, ..., $N_{sel}$) respectively represent the mean and variance of a phoneme model of a selected speaker. Furthermore, $C_{mix}^j$ (j=1, ..., $N_{sel}$) and $C_{state}^k[i][j]$ (k=1, ..., $N_{sel}$, i, j=1, ..., $N_{state}$) respectively represent the EM count in the Gaussian distribution and the EM count relating to the state transition.

The adaptive model creating device disclosed in Patent Document 1 is a device obtained by modifying the adaptive model creating device disclosed in Non Patent Document 1 so as to prevent a deterioration in accuracy for the adaptive model under a noise environment. The adaptive model creating device disclosed in Patent Document 1 includes an accumulation section, a first selection section, a second selection section, and a model creating section. The accumulation section accumulates sufficient statistics created using voice data contained in groups, for each of a plurality of groups obtained by grouping the voice data, on which noise is superimposed, based on the acoustic similarity. For example, groups are formed for each (noise type×SN ratio), and sufficient statistics for each (speaker×voice variation of speaker) are accumulated in the groups. The first selection unit selects a group acoustically similar to voice data of the utterance speaker from among the plurality of groups. The second selection unit selects a sufficient statistic acoustically similar to the voice data of the utterance speaker from among the sufficient statistics relating to the group selected by the first selection group. The model creating section creates an acoustic model using the sufficient statistics selected by the second selection unit.

[Patent Document 1]
Japanese Patent No. 3756879
[Non Patent Document 1]
"Unsupervised Phoneme Model Training Based on the Sufficient HMM Statistics from Selected Speakers", Authors; Yoshizawa Shinichi, Baba Akira, Matsunami Kanako, Mera Yuichiro, Yamada Miichi, Lee Akinobu, Shikano Kiyohiro; The Institute of Electronics, Information and Communication Engineers, March 2002, Vol. J85-D-II, No. 3, pages 382-389

DISCLOSURE OF INVENTION

Technical Problem

Conventional speaker adaptive model creating devices have a problem in that they are not necessarily adapted to a temporal change in a series of conversations or calls. The reason is that an arbitrary number of utterances (although a single arbitrary utterance is used in the adaptive model creating method disclosed in Non Patent Document 1 and in the adaptive model creating method disclosed in Patent Document 1, the number of utterances is not limited to one, so an arbitrary number of utterances are used) is used as adaptive data to select an N number of speakers once (in the adaptive model creating method disclosed in Patent Document 1, selection is carried out twice, i.e., group selection and speaker selection), and the created adaptive model is used for all the utterances that temporarily change in a series of conversations or the entire call.

In the method of using an arbitrary number of utterances (especially, a long-time utterance, and a series of conversations or the entire call) as adaptive data to select an N number of speakers only once, a comprehensive model, i.e., a model that matches, to some extent, every utterance constituting a series of conversations or the entire call is more likely to be created, and the temporal change in the series of conversations or calls is not taken into consideration. Meanwhile, it is also possible to employ a method of selecting a speaker per utterance and sequentially create an adaptive model in a framework similar to that of the conventional adaptive model creating method of selecting speakers using a single utterance to create an adaptive model. In this method, however, a local model, i.e., a model that matches under specific conditions is more likely to be created, and the model is inferior to the comprehensive model in terms of stability.

In view of the above, an object of the present invention is to provide a speaker selecting device, a speaker selecting method, and a speaker selecting program that are capable of selecting a speaker, the acoustic feature value of which is similar to that of the utterance speaker, with accuracy and stability, while adapting to changes, even if the acoustic feature value of the speaker changes every moment due to a temporal change in a series of conversations or calls as in the case of a spoken language, and also provide a speaker adaptive model creating device using the speaker selecting device.

Technical Solution

A speaker selecting device according to the present invention includes: a speaker model storage means that stores a plurality of speaker models; an acoustic feature value calculating means that calculates a feature value from received voice signals; and a speaker score calculating means that calculates a likelihood of each of the plurality of speaker models stored in the speaker model storage means with respect to the feature value calculated by the acoustic feature value calculating means, the speaker selecting device being configured to select speakers using the likelihood calculated by the speaker score calculating means. The speaker selecting device is characterized in that: the speaker score calculating means calculates a first likelihood (e.g. likelihood of a GMM with respect to long-time utterance data) based on a first standard and a second likelihood (e.g. likelihood of a GMM with respect to short-time utterance data) based on a second standard; the speaker score calculating means includes a first selection means (e.g. a long-time speaker selecting means 23) that selects speakers corresponding to a predetermined number of speaker models the first likelihood of which is high, and a second selection means (e.g. a short-time speaker selecting means 24) that narrows the speakers selected by the first selection means down to speakers the number of which is smaller than the predetermined number and the second likelihood of which is high; and the speaker score calculating means sequentially outputs information (e.g. speaker IDs) corresponding the speakers selected by the second selection means.

In a preferred embodiment of the speaker selecting device according to the present invention, the speaker score calculating means calculates, as the first likelihood, a long-time likelihood based on a voice signal of a relatively long time (e.g. during a period corresponding an arbitrary number of utterances. For example, a period corresponding to a long-time utterance or a series of conversations or the entire call), and calculates, as the second likelihood, a short-time likelihood based on a voice signal of a relatively short time (e.g. a period corresponding to a short-time utterance. As long as a unit shorter than an arbitrary number of utterances is used, the unit is not limited to a single utterance). Further, the first selection means is a long-time speaker selecting means that selects speakers corresponding to a predetermined number of speaker models the long-time likelihood of which is high, and the second selection means is a short-time speaker selecting means that selects speakers corresponding to speaker models the number of which is smaller than the predetermined number and the short-time likelihood of which is high.

In another preferred embodiment of the speaker selecting device according to the present invention, the speaker score calculating means calculates, as the first likelihood, a short-time likelihood based on a voice signal of a relatively short time, and calculates, as the second likelihood, a long-time likelihood based on a voice signal of a relatively long time. Further, the first selection means is a short-time speaker selecting means that selects speakers corresponding to a predetermined number of speaker models the short-time likelihood of which is high, and the second selection means is a long-time speaker selecting means that selects speakers corresponding to the predetermined number of speaker models the long-time likelihood of which is high.

The long-time speaker selecting means may be configured to select the speakers using the likelihoods calculated by the speaker score calculating means, and a first threshold relating to a predetermined likelihood, and the short-time speaker selecting means may be configured to selects the speakers using the likelihoods calculated by the speaker score calculating means, and a second threshold which is a threshold relating to a predetermined likelihood and which is a value equal to or different from the first threshold.

The speaker selecting device may further include an utterance dependence storage means that stores data indicating a temporal dependence between utterances, and the speaker score calculating means may be configured to calculate the likelihoods by reflecting the data stored in the utterance dependence storage means.

A speaker adaptive model creating device according to a preferred embodiment includes: the above-mentioned speaker selecting device; and an adaptive model creating means that creates a speaker adaptive model by statistical calculation based on sufficient statistics corresponding to speakers selected by the speaker selecting device.

A speaker adaptive model creating device according to another preferred embodiment includes: the above-mentioned speaker selecting device; a means (e.g. a sufficient statistic integrating means 26) that creates one sufficient statistic relating to a long-time speaker by statistical calculation, from sufficient statistics respectively corresponding to a plurality of speakers selected by a long-time speaker selecting means; a means (which is implemented by an adaptive model creating means 25 of a fourth embodiment, for example) that creates one sufficient statistic relating to a short-time speaker by statistical calculation, from sufficient statistics respectively corresponding to a plurality of speakers selected by a short-time speaker selecting means; and an adaptive model creating means that integrates, by statistical calculation, the sufficient statistics calculated by each of the means, to thereby create a speaker adaptive model.

A speaker adaptive model creating device according to still another preferred embodiment includes: the above-mentioned speaker selecting device; a short-time speaker integrating means that calculates a frequency of occurrence of speakers selected by a short-time speaker selecting means (e.g. a histogram representing IDs of speakers that have occurred); and an adaptive model creating means (e.g. an adaptive model creating means 25 of a fifth embodiment) that creates one speaker adaptive model by weighting and integrating sufficient statistics based on the frequency of occurrence of speakers.

The long-time speaker selecting means uses a large amount of utterance data such as a series of conversations or calls, for example, and thus the accuracy for selecting speakers is stable. Accordingly, the short-time speaker selecting means narrows a group of speakers selected by the long-time speaker selecting means down to a speaker suitable for a single utterance, by using a small amount of utterance data such a single utterance, thereby achieving the object of the present invention. Further, also when the long-time speaker selecting means narrows down a group of speakers selected by the short-time speaker selecting means, the object of the present invention can be achieved.

Advantageous Effects

The present invention has an effect capable of accurately selecting speakers, the acoustic feature value of which is similar to that of an utterance speaker, per utterance. The reason is that the speakers selected by the first selection means are narrowed down by the second selection means to speaker models the number of which is smaller than the predetermined number and the second likelihood of which are high. Specifically, for example, speakers, the acoustic feature value of which is similar to that of the utterance speaker, are selected using a large amount of utterance data such as a series of conversations or calls, and then a speaker suitable for a single utterance is selected from among the group of speakers by using a small amount of utterance data such as a single utterance, for example. Thus, the speakers can be narrowed down to a usable speaker per utterance, while maintaining the stable accuracy for selecting speakers. The selection of speakers using relatively-short utterance data such as a single utterance makes it possible to adapt to changes, even if the acoustic feature value of the speaker changes every moment due to a temporal change in a series of conversations or calls.

BRIEF DESCRIPTION OF DRAWINGS

FIG. 12 is an explanatory diagram showing an example of a speaker model;

FIG. 13 is an explanatory diagram showing an example of log likelihood; and

EXPLANATION OF REFERENCE

| | |
|---|---|
| 1 | INPUT UNIT |
| 2 | DATA PROCESSING UNIT |
| 3 | STORAGE UNIT |
| 21 | ACOUSTIC FEATURE VALUE CALCULATING MEANS |
| 22 | SPEAKER SCORE CALCULATING MEANS |
| 23 | LONG-TIME SPEAKER SELECTING MEANS |
| 24 | SHORT-TIME SPEAKER SELECTING MEANS |
| 25 | ADAPTIVE MODEL CREATING MEANS |
| 26 | SUFFICIENT STATISTIC INTEGRATING MEANS |
| 27 | SHORT-TIME SPEAKER INTEGRATING MEANS |
| 31 | SPEAKER MODEL STORAGE SECTION |
| 32 | SUFFICIENT STATISTIC STORAGE SECTION |
| 33 | UTTERANCE DEPENDENCE STORAGE SECTION |

BEST MODES FOR CARRYING OUT THE INVENTION

Next, best modes for carrying out the present invention will be described in detail with reference to the drawings.

Figure 1:
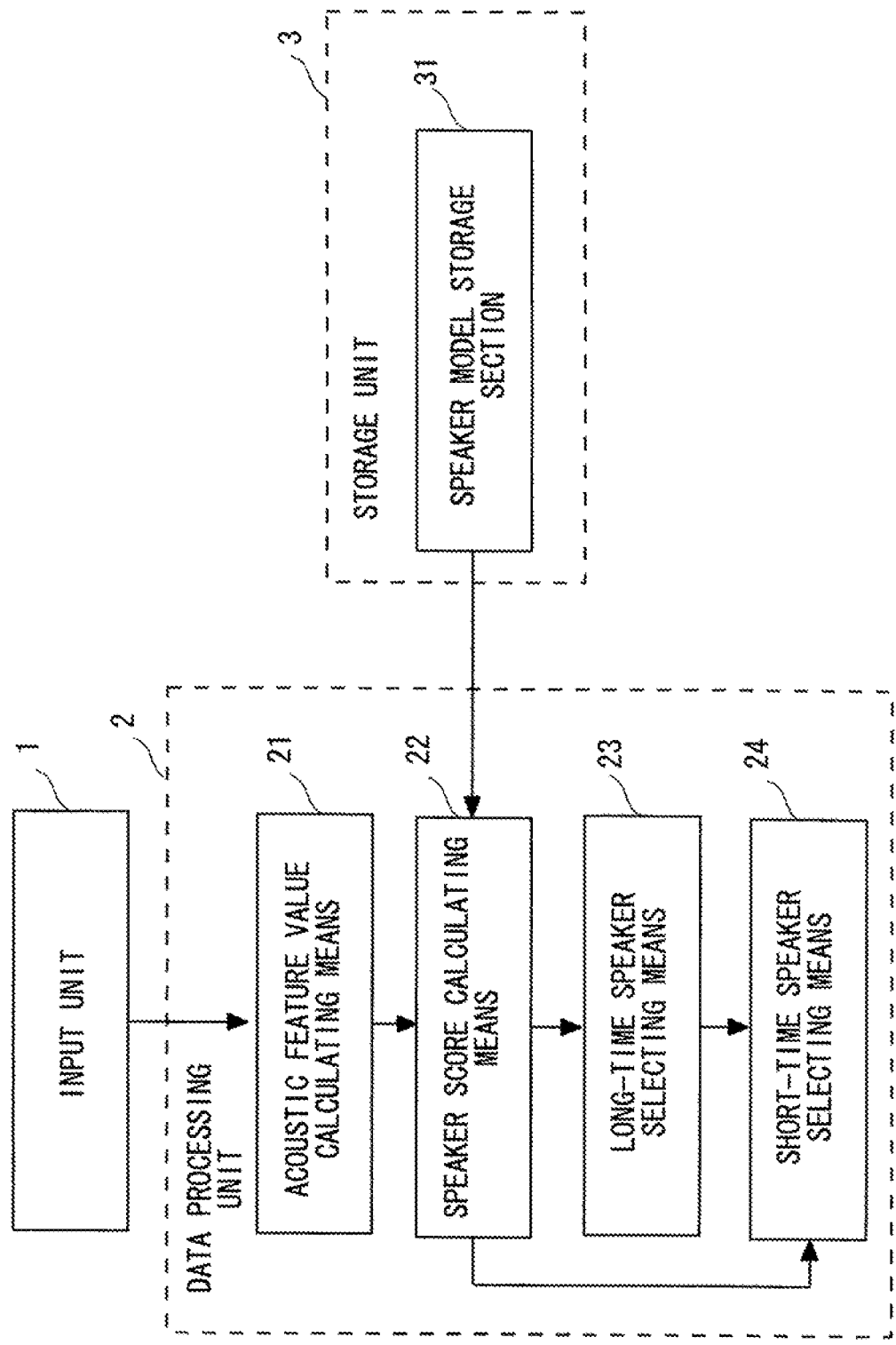
FIG. 1 is a block diagram showing the configuration of a first embodiment of the present invention.

FIG. 1 is a block diagram showing the configuration of a speaker selecting device according to a first embodiment of the present invention. As shown in FIG. 1, the speaker selecting device of the first embodiment includes an input unit 1 such as a microphone, a data processing unit 2 including a central processing unit (CPU) that operates under program control, and a storage unit 3 that stores information.

The storage unit 3 includes a speaker model storage section 31. The speaker model storage section 31 stores a plurality of speaker models, each of which is described by a GMM. The speaker models stored in the speaker model storage section 31 are read by a speaker score calculating means 22 in the case of calculating the speaker scores. Here, like the speaker models disclosed in Non Patent Document 1, speaker models are created in advance using a 1-state 64-mixture GMM without distinction of the phoneme. Note that the speaker model is not necessarily limited to the GMM. For example, the speaker model may be created using an HMM, an SVM (Support Vector Machine), an NN (Neural Network), or a BN (Bayesian Network).

The data processing unit 2 includes an acoustic feature value calculating means 21, the speaker score calculating means 22, a long-time speaker selecting means 23, and a short-time speaker selecting means 24. Note that these means can be implemented by software.

The acoustic feature value calculating means 21 receives a voice signal recorded by the input unit 1 such as a microphone, calculates feature values necessary for voice recognition, and outputs them to the speaker score calculating means 22. The voice signal is, for example, voice data which is A/D converted at a sampling frequency of 44.1 kHz and at a rate of 16 bits. The feature values are, for example, mel-frequency cepstral coefficients (MFCCs) disclosed in the above-mentioned non patent Document 1 and their rates of change. The acoustic feature value calculating means 21 extracts voice data in the form of time-series feature vectors by segmenting the voice data at constant intervals of about 10 msec, each of which is called a frame, and performing thereon a preemphasis, a fast Fourier transform (FFT), a filter bank analysis, and a cosine transform. Note that the feature values are not particularly defined, and voice data itself may be used.

The speaker score calculating means 22 reads the speaker models which are prestored in the speaker model storage section 31 and described by the GMM. Then, the speaker score calculating means 22 receives the feature values for each frame extracted by the acoustic feature value calculating means 21, calculates a speaker score for each speaker model, and outputs a set of the speaker score and a corresponding speaker (specifically, for example, a speaker ID for identifying a speaker, i.e., a speaker ID for identifying a speaker model) to the long-time speaker selecting means 23 and the short-time speaker selecting means 24. The speaker score is the log likelihood of the GMM with respect to the received feature value. The speaker score calculating means 22 adds the log likelihood of the GMM that is calculated on an utterance unit basis for each frame, by an arbitrary number of frames, thereby calculating the speaker score for a series of conversations or calls. That is, a speaker score for a frame of any arbitrary length (or length of utterance) can be calculated. Here, a speaker score of a relatively long time (hereinafter referred to as "long time") such as a series of conversations or the entire call, and a speaker score of a relatively short time (hereinafter referred to as "short time") such as a single utterance are calculated, and a set of the corresponding speaker ID and speaker score is output to each of the long-time speaker selecting means 23 and the short-time speaker selecting means 24. The long time is a time relatively longer than the short time, and the range of the long time (e.g. a series of conversations or an entire call) and the range of the short time (e.g. a single utterance) are determined in advance. Additionally, each of the long time and the short time may be an indefinite time (non-constant time).

The long-time speaker selecting means 23 receives the set of the speaker ID and speaker score for the long time, which is output from the speaker score calculating means 22, and outputs speaker IDs of the top N1 number of speakers having a high score to the short-time speaker selecting means 24. Note that, while the number of speakers to be selected (the value of N1 in this case) is empirically determined in Non Patent Document 1, a threshold relating to the speaker score may be preset and the value of N1 may be determined based on the threshold. The top N1 number of speakers having a high score, which are herein selected, are hereinafter referred to as long-time speakers.

The short-time speaker selecting means 24 receives the set of the speaker ID and speaker score for the short time, which is output from the speaker score calculating means 22, and the N1 number of long-time speakers output from the long-time speaker selecting means 23, and selects IDs of the top Ns (<N1) number of speakers having a high score from among the N1 number of long-time speakers. While the number of speakers to be selected (the value of Ns in this case) is empirically determined in the speaker selecting device disclosed in Non Patent Document 1, a second threshold relating to the speaker score may be preset and the value of Ns may be determined based on the second threshold in this embodiment. Note that in the case of setting the threshold relating to the speaker score, the second threshold may be equal to or different from the first threshold (threshold for determining the value of N1) relating to the speaker score used by the long-time speaker selecting means 23. Further, the threshold is set with reference to the results of speaker selection previously performed, for example. The top Ns number of speakers having a high score, which are herein selected, are hereinafter referred to as short-time speakers.

Note that the long-time speaker selecting means 23 and the short-time speaker selecting means 24, which are shown in FIG. 1, may be replaced with each other. In the case of replacement, the short-time speaker selecting means 24 first sequentially selects the top Ns number of speakers having a high speaker score, and then the long-time speaker selecting means 23 selects the top N1 (<Ns) number of speakers having a high speaker score from among them.

Figure 2:
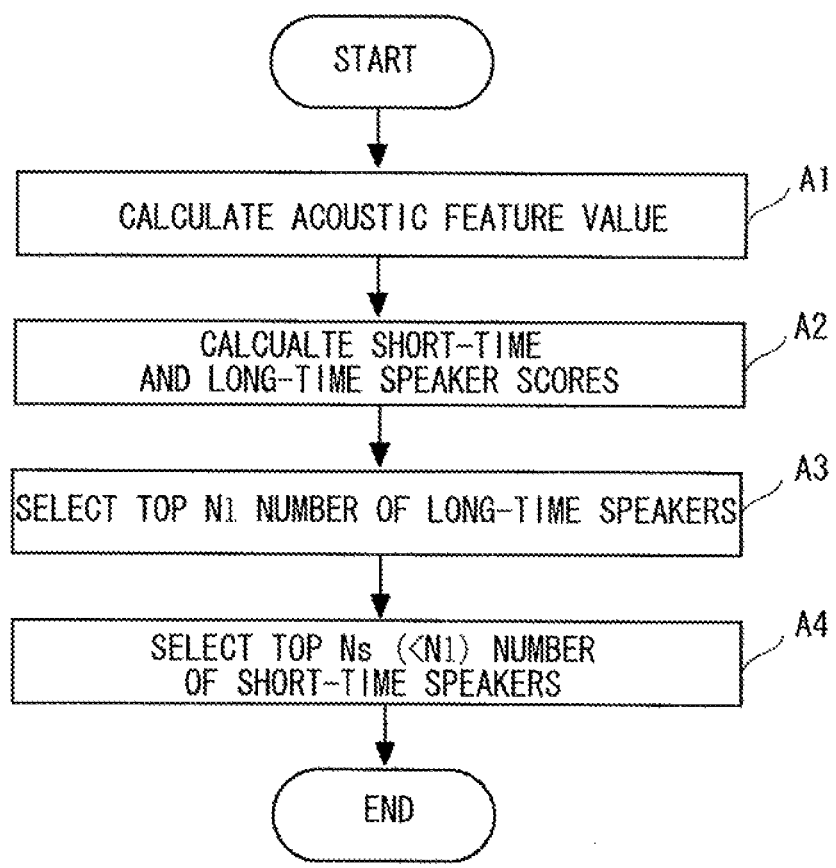
FIG. 2 is a flowchart showing operation of the first embodiment of the present invention.

Referring next to the flowchart of FIG. 2, the operation of the speaker selecting device of the first embodiment shown in FIG. 1 will be described in detail.

First, the acoustic feature value calculating means 21 reads the voice signal supplied from the input unit 1, and calculates feature values necessary for voice recognition, such as mel-frequency cepstral coefficients (MFCCs) and their rates of change, for each frame (Step A1).

Next, the speaker score calculating means 22 reads the speaker models which are stored in the speaker model storage section 31 and described by the GMM, calculates, for each frame, the log likelihood of the GMM with respect to the feature values obtained through the processing of Step A1, and adds a number of frames corresponding to the short time and the long time, thereby calculating each of a short-time speaker score (short-time likelihood) and a long-time speaker score (long-time likelihood) (Step A2). Assuming that a voice equivalent to the long time corresponds to all the series of conversations and a voice equivalent to the short time is a single utterance, for example, a single long-time speaker score (a set of the speaker ID and speaker score) is present, while a number of short-time speaker scores (sets of the speaker ID and speaker score) corresponding to the number of utterances constituting all the series of conversations are present.

Subsequently, the long-time speaker selecting means 23 reads the long-time speaker scores (sets of the speaker ID and speaker score) obtained through the processing of Step A2, compares the scores to select the IDs of the top N1 number of speakers having a high score, and outputs the selected IDs of the top N1 number of speakers having a high score to the short-time speaker selecting means 24 (Step A3).

Lastly, the short-time speaker selecting means 24 reads the speaker IDs of the N1 number of long-time speakers obtained through the processing of Step A3, and the short-time speaker scores (sets of the speaker ID and speaker score) obtained through the processing of Step A2. The short-time speaker selecting means 24 sequentially reads the short-time speaker scores by the number of utterances, for example. Then, the short-time speaker selecting means 24 compares the short-time speaker scores of speakers, which are contained in the N1 number of long-time speakers, among the read short-time speaker scores, selects the speaker IDs of the top Ns (<N1) number of speakers having a high short-time speaker score, from among the N1 number of long-time speakers, and sequentially outputs the selected speaker IDs (Step A4).

Next, the effects of this embodiment will be described. This embodiment employs a configuration in which, after the long-time speaker selecting means 23 selects speakers (long-time speakers) having similar acoustic features based on the long-time speaker scores calculated by the speaker score calculating means 22, the short-time speaker selecting means 24 selects speakers (short-time speakers) having similar acoustic features from among the long-time speakers selected at the previous stage (long-time speaker selected means 23), based on the short-time speaker scores calculated by the speaker score calculating means 22, and sequentially outputs IDs of the selected speakers. This configuration enables speaker selection with high accuracy while adapting to changes in acoustic feature value of each speaker, even if the acoustic feature value of each speaker varies every moment due to a temporal change in a series of conversations or calls, as in a spoken language.

Figure 3:
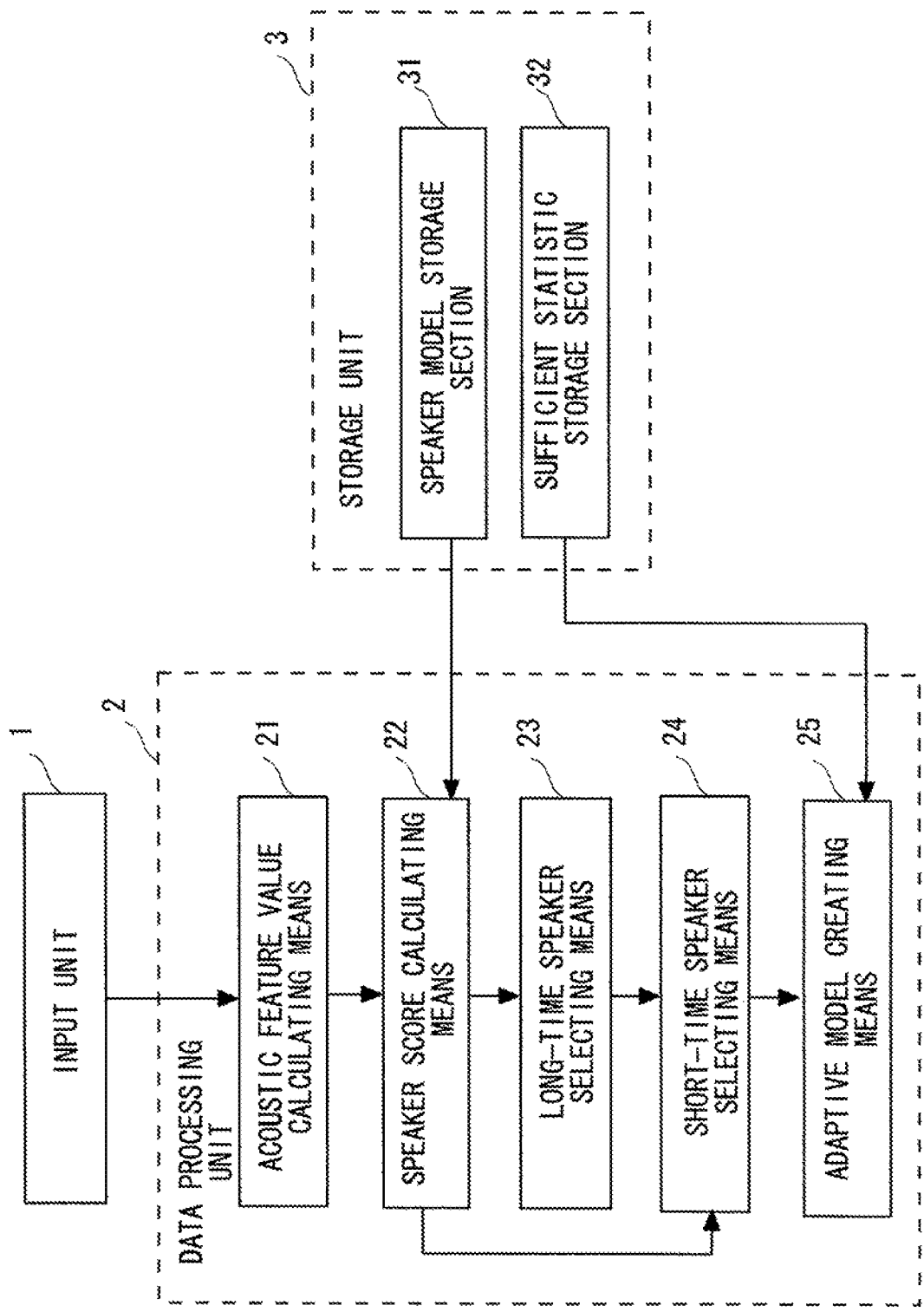
FIG. 3 is a block diagram showing the configuration of a second embodiment of the present invention.

Next, a second embodiment of the present invention will be described in detail with reference to the drawings. FIG. 3 is a block diagram showing the configuration of a speaker selecting device according to the second embodiment of the present invention.

As shown in FIG. 3, the speaker selecting device of the second embodiment differs from that of the first embodiment in that the storage unit 3 includes a sufficient statistic storage section 32 in addition to the speaker model storage section 31 of the first embodiment shown in FIG. 1, and in that the data processing unit 2 includes an adaptive model creating means 25 in addition to the configuration of the first embodiment. Note that a device including the storage unit 3, the acoustic feature value calculating means 21, the speaker score calculating means 22, the long-time speaker selecting means 23, and the short-time speaker selecting means 24, which are shown in FIG. 3, may be defined as a speaker selecting device, and a device further including the adaptive model creating means 25 may be defined as a speaker adaptive model creating device.

The sufficient statistic storage section 32 stores sufficient statistics relating to the HMM for each speaker. The stored sufficient statistics are read by the adaptive model creating means 25 in the case of creating a speaker adaptive model. The sufficient statistic refers to a statistic sufficient to represent the nature of a database, which includes the mean, variance, and EM count of a phoneme model represented by an HMM, as in the case of the speaker selecting device disclosed in Non Patent Document 1. The sufficient statistic is calculated in advance by one-time learning from a phoneme model learned from only a male voice in the case of a male speaker, and from a phoneme model learned from only a female voice in the case of a female speaker, by using the EM algorithm, and is stored in the sufficient statistic storage section 32.

The adaptive model creating means 25 receives the speaker IDs output from the short-time speaker selecting means 24, and reads the sufficient statistic corresponding to the speaker IDs from the sufficient statistic prestored in the sufficient statistic storage section 32. Then, the adaptive model creating means 25 creates a speaker adaptive model by statistical calculation using the read sufficient statistics, and outputs it. As in the case of the speaker selecting device disclosed in Non Patent Document 1, the adaptive model creating means 25 performs statistical calculation using the above-mentioned equations 1 to 3.

Referring next to the flowchart of FIG. 4, the overall operation of the speaker selecting device of the second embodiment shown in FIG. 3 will be described in detail.

Figure 4:
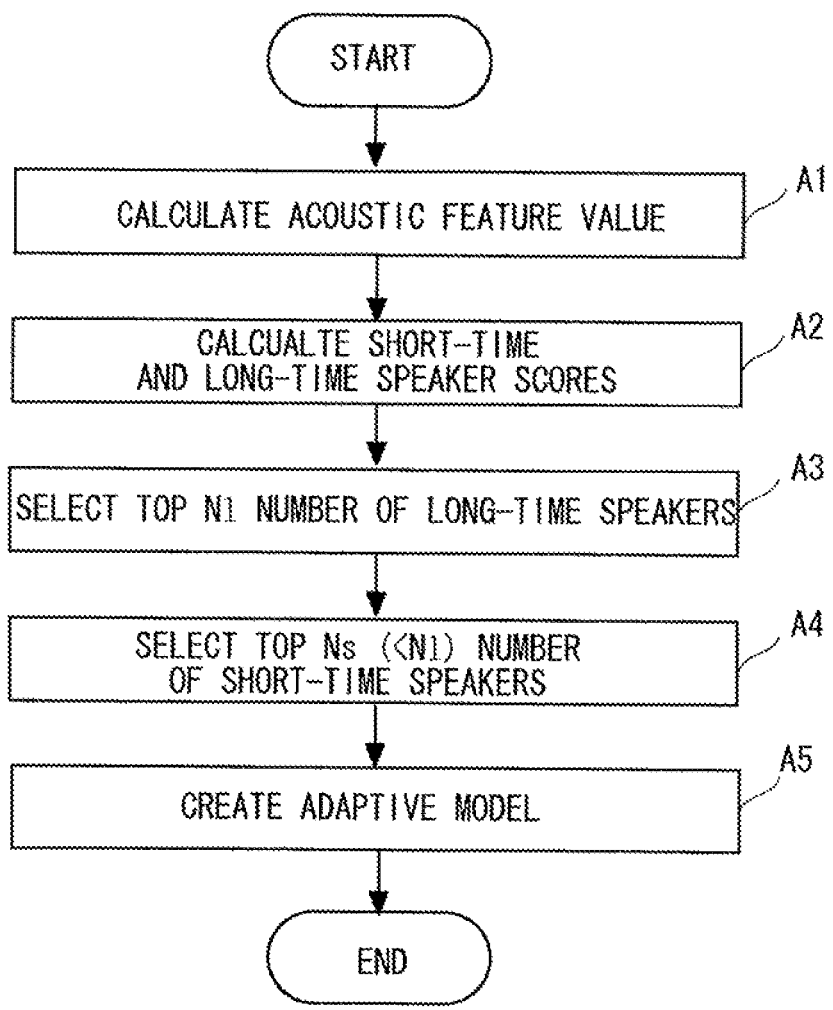
FIG. 4 is a flowchart showing operation of the second embodiment of the present invention.

The operations of the acoustic feature value calculating means 21, the speaker score calculating means 22, the long-time speaker selecting means 23, and the short-time speaker selecting means 24, which are respectively represented by Steps A1, A2, A3, and A4 in FIG. 4, are identical with those of the first embodiment, so the description thereof is omitted.

In the first embodiment, the speaker IDs selected by the short-time speaker selecting means 24 are sequentially output. In this embodiment, the adaptive model creating means 25 reads the sufficient statistics corresponding to the speakers selected by the short-time speaker selecting means 42, from the sufficient statistic storage section 32, and sequentially creates speaker adaptive models by statistical calculation (Step A5). The adaptive model creating means 25 may weight and integrate the sufficient statistics corresponding to the speakers selected by the short-time speaker selecting means 24, based on, for example, a log likelihood of a GMM with respect to a received feature value, which is output from the speaker score calculating means 22, or based on an arbitrary value. As an example of weighting and integration based on the log likelihood of the GMM, normalization (Wa (weight of speaker "a")=L1 (log likelihood of GMM relating to the top speaker)/La (log likelihood of GMM relating to speaker "a")) may be employed (a speaker having a maximum log likelihood among the selected speakers is herein referred to as "top speaker"). Further, as an example of weighting and integration based on an arbitrary value, linear weighting may be employed.

Next, the effects of the second embodiment of the present invention will be described. The second embodiment employs a configuration in which, after the long-time speaker selecting means 23 selects speakers (long-time speakers) having similar acoustic features based on the long-time speaker scores calculated by the speaker score calculating means 22, the short-time speaker selecting means 24 selects speakers (short-time speakers) having similar acoustic features from among the long-time speakers selected at the previous stage (speaker score calculating means 22), based on the short-time speaker scores calculated by the speaker score calculating means 22, and the adaptive model creating means 25 sequentially creates speaker adaptive models. This configuration makes it possible to stably create adaptive models while adapting to changes, even if the acoustic features of the speakers change every moment due to a temporal change in a series of conversations or calls.

Note that the long-time speaker selecting means 23 and the short-time speaker selecting means 24, which are shown in FIG. 3, may be replaced with each other. In the case of replacement, the short-time speaker selecting means 24 first sequentially selects the top Ns number of speakers having a high speaker score, and then the long-time speaker selecting means 23 selects the top N1 (<Ns) number of speakers having a high speaker score from among them.

Figure 5:
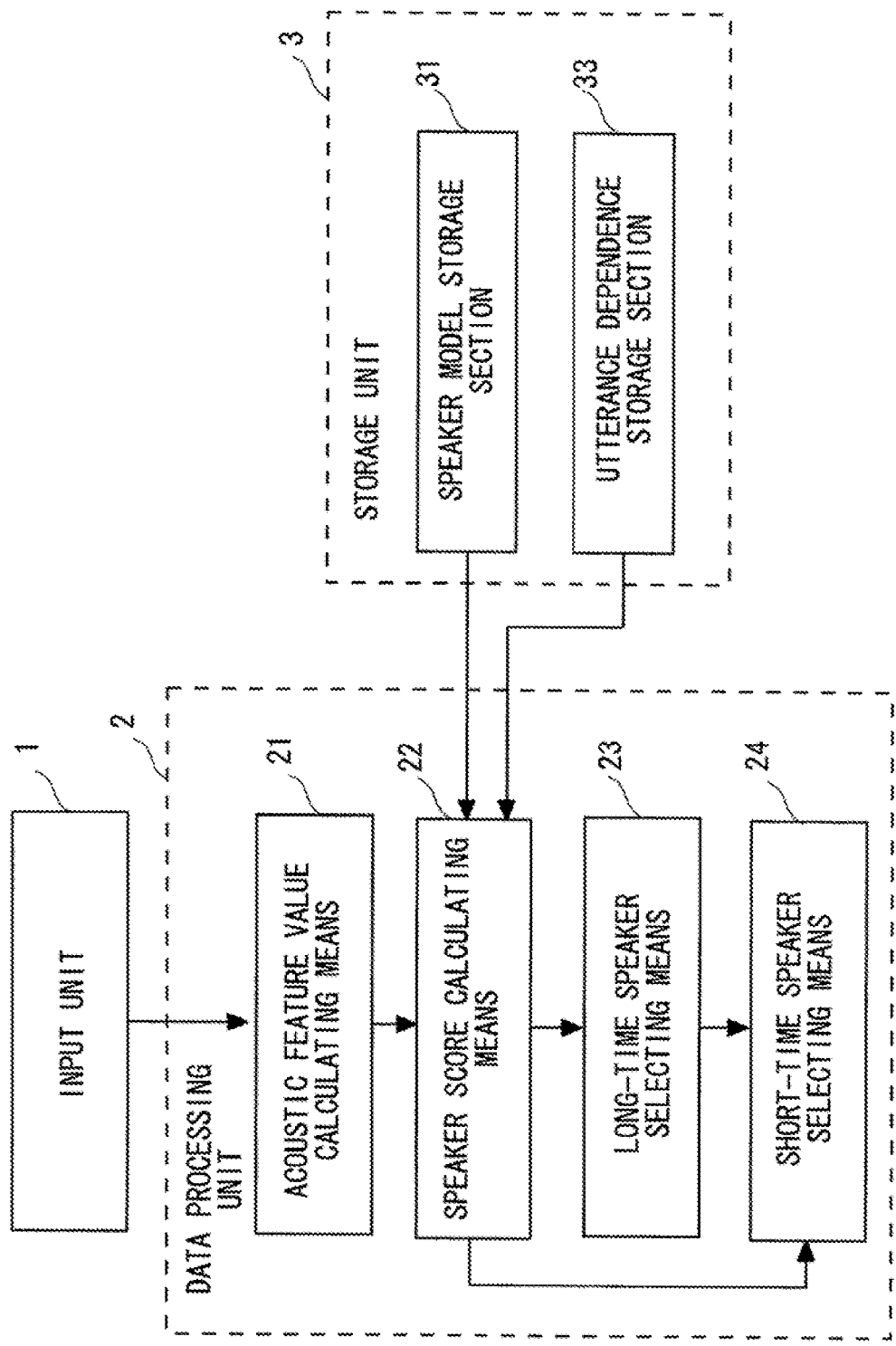
FIG. 5 is a block diagram showing the configuration of a third embodiment of the present invention.

Next, a third embodiment of the present invention will be described in detail with reference to the drawings. FIG. 5 is a block diagram showing the configuration of a speaker selecting device according to the present invention.

As shown in FIG. 5, the speaker selecting device of the third embodiment of the present invention differs from that of the first embodiment in that the storage unit 3 includes an utterance dependence storage section 33 in addition to the speaker model storage section 31 of the first embodiment shown in FIG. 1. Further, the operation of the speaker score calculating means 22 differs from the operation of the speaker score calculating means 22 shown in FIG. 1 in that the output of the utterance dependence storage section 33 is also used as an input.

The utterance dependence storage section 33 prestores a transition probability representing a temporal dependence between utterances (not only utterances but frames, for example, may be used as units). The transition probability represents, as a probability value, a probability (or difficulty) of transition from one speaker to another speaker relating to the acoustic feature. The speaker refers to an arbitrary speaker selected from a plurality of speakers stored in each of the speaker model storage section 31 and the sufficient statistic storage section 32.

Figure 7:
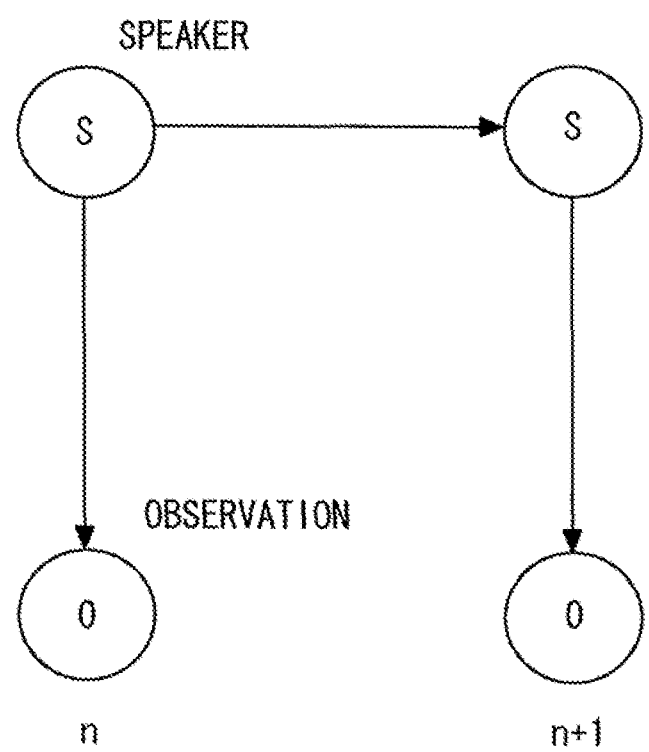
FIG. 7 is a diagram showing an example of a stochastic model used in speaker score calculating means.

The speaker score calculating means 22 reads the speaker models which are prestored in the speaker model storage section 31 and represented by the GMM, and the transition probability prestored in the utterance dependence storage section 33, receives the feature values in frame units, which are extracted by the acoustic feature value calculating means 21, to calculate a speaker score, and outputs a set of the corresponding speaker ID and speaker score to the long-time speaker selecting means 23 and the short-time speaker selecting means 24. The speaker score into which the transition probability is introduced is calculated using a stochastic model represented by a BN (Bayesian Network) or an HMM shown in FIG. 7. The BN refers to a directed acyclic graph defined by nodes each representing a random variable and branches each representing a direct dependence between random variables. Referring to FIG. 7, nodes S are random variables each representing a speaker, and nodes O are random variables each representing an acoustic feature vector. Further, each of the nodes S holds the transition probability read from the utterance dependence storage section 33, and each of the nodes O holds the GMM read from the speaker model storage section 31. "n" represents an utterance number (or frame number). In the BN, for example, speaker scores (long-time speaker score and short-time speaker score) into which the transition probability is introduced can be calculated using a probability propagation method disclosed in the patent Document 1.

Referring next to the flowchart of FIG. 6, the overall operation of the speaker selecting device of the third embodiment shown in FIG. 5 will be described in detail.

Figure 6:
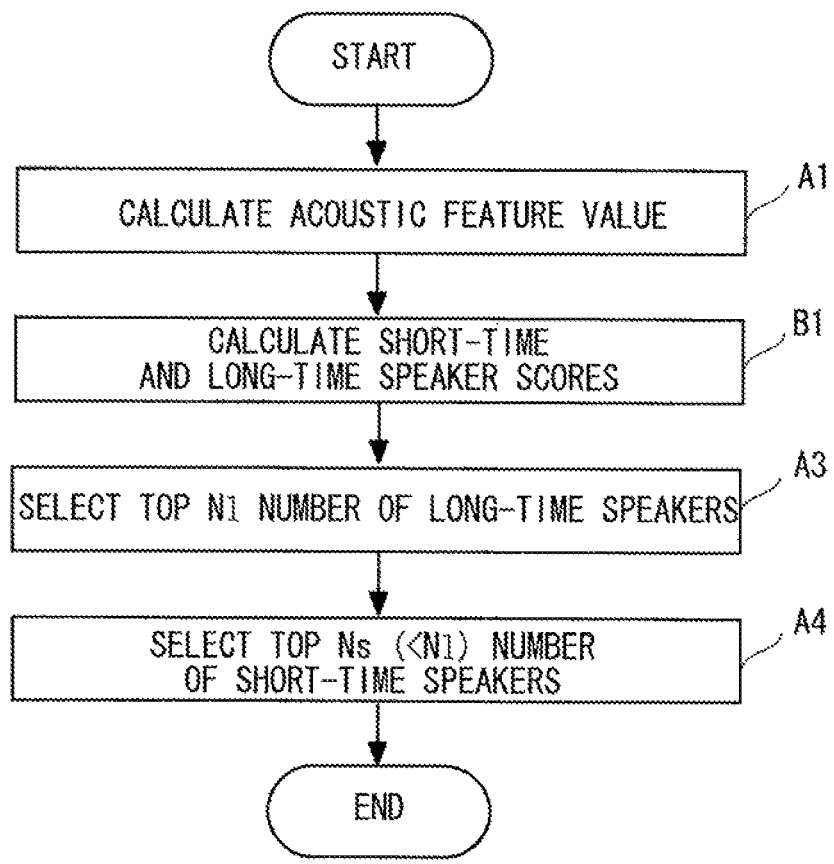
FIG. 6 is a flowchart showing operation of the third embodiment of the present invention.

The operations of the acoustic feature value calculating means 21, the long-time speaker selecting means 23, and the short-time speaker selecting means 24 of the third embodiment, which are respectively represented by Steps A1, A3, and A4 in FIG. 6, are similar to those of the first embodiment, so the description thereof is omitted.

In the first embodiment, the speaker score calculating means 22 reads the speaker models from the speaker model storage section 31, and calculates the log likelihood of the GMM with respect to the received feature value. In this embodiment, the speaker score calculating means 22 reads the speaker models from the speaker model storage section 31, and reads the transition probability between speakers, from the utterance dependence storage section 33, while performing control of the temporal transition relating to the acoustic feature value of each speaker per utterance (or per frame), i.e., reflecting the transition probability between speakers, thereby calculating speaker scores (Step B1). The transition probability between speakers represents, as a probability value, a probability (or difficulty) of transition from one speaker to another speaker relating to the acoustic feature. For example, when the acoustic feature value of a male speaker A greatly differs from the acoustic feature value of a female speaker B, and the acoustic feature value of the male speaker A is similar to the acoustic feature value of a male speaker C, the transition probability from the speaker A to the speaker B is set to a value relatively smaller than that of the transition probability from the speaker A to the speaker C. The introduction of the transition probability between speakers enables calculation of the speaker score in the current utterance while inheriting the effect of the speaker score in the previous utterance.

Next, the effects of the third embodiment will be described. In the third embodiment, the speaker scores are calculated by introducing therein the transition probability relating to the acoustic feature value of each speaker, and the effect of the acoustic feature value of the speaker in the previous utterance (or previous frame) can be reflected on the current utterance (or current frame), which makes it possible to stably select speakers. For example, it is possible to suppress such a phenomenon that the speakers that are not selected at all in all the previous utterances are unexpectedly selected only in the current utterance.

Note that the long-time speaker selecting means 23 and the short-time speaker selecting means 24, which are shown in FIG. 5, may be replaced with each other. In the case of replacement, the short-time speaker selecting means 24 first sequentially selects the top Ns number of speakers having a high speaker score, and then the long-time speaker selecting means 23 selects the top N1 (<Ns) speakers having a high speaker score from among them.

Figure 8:
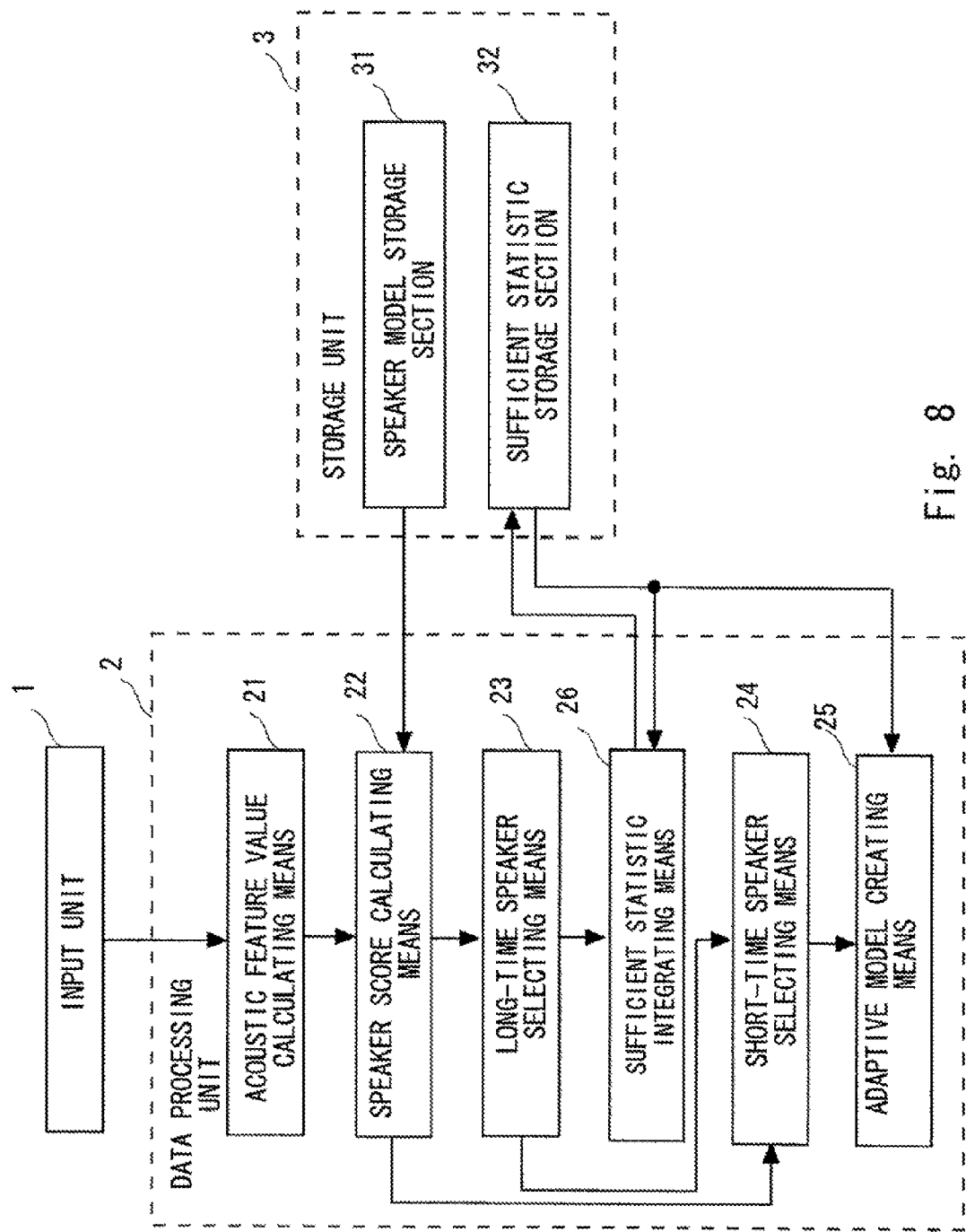
FIG. 8 is a block diagram showing operation of a fourth embodiment of the present invention.

Next, a fourth embodiment of the present invention will be described in detail with reference to the drawings. FIG. 8 is a block diagram showing the configuration of a speaker selecting device according to the present invention.

As shown in FIG. 8, the data processing unit 2 of the fourth embodiment differs from that of the second embodiment in including a sufficient statistic integrating means 26 is addition to the configuration of the second embodiment shown in FIG. 3. Note that the long-time speaker selecting means 23 shown in FIG. 8 outputs a long-time speaker ID to the short-time speaker selecting means 24 as well as the sufficient statistic integrating means 26. Note that a device including the storage unit 3, the acoustic feature value calculating means 21, the speaker score calculating means 22, the long-time speaker selecting means 23, and the short-time speaker selecting means 24, which are shown in FIG. 8, may be defined as a speaker selecting device, and a device further including the sufficient statistic integrating means 26 and the adaptive model creating means 25 may be defined as a speaker adaptive model creating device.

The sufficient statistic integrating means 26 receives speaker IDs output from the long-time speaker selecting means 23, and reads the sufficient statistics corresponding to the speaker IDs from the sufficient statistics prestored in the sufficient statistic storage section 32. Then, all the read sufficient statistics are integrated to create one sufficient statistic by statistical calculation, and stores the created sufficient statistic in the sufficient statistic storage section 32. The sufficient statistic integrating means 26 performs statistical calculation using the above-mentioned equations 1 to 3 in a similar manner as the processing carried out by the adaptive model creating means 25.

Referring next to the flowchart of FIG. 9, the overall operation of the speaker selecting device of this embodiment shown in FIG. 8 will be described in detail.

Figure 9:
FIG. 9 is a flowchart showing operation of the fourth embodiment of the present invention.

The operations of the acoustic feature value calculating means 21, the speaker score calculating means 22, and the short-time speaker selecting means 24 of the fourth embodiment, which are respectively represented by Steps A1, A2, and A4 in FIG. 9, are similar to those of the second embodiment, so the description thereof is omitted.

In the second embodiment, the long-time speaker selecting means 23 outputs the speaker IDs of the top N1 number of speakers having a high score only to the short-time speaker selecting means 24, while in this embodiment, the long-time speaker selecting means 23 outputs the long-time speaker ID to the short-time speaker selecting means 24 as well as the sufficient statistic integrating means 26 (Step C1).

Further, in the second embodiment, the short-time speaker selecting means 24 further selects speakers from among the speakers selected by the long-time speaker selecting means 23, and the adaptive model creating means 25 sequentially creates the speaker adaptive models. In this embodiment, the sufficient statistic integrating means 26 reads the sufficient statistic corresponding to the speakers selected by the long-time speaker selecting means 23 from the sufficient statistic storage section 32, creates one sufficient statistic relating to the long-time speaker by statistical calculation, and stores the created sufficient statistic in the sufficient statistic storage section 32 (Step C2).

The adaptive model creating means 25 first reads the sufficient statistic relating to the long-time speaker, which is created in the processing of Step C2, from the sufficient statistic storage section 32. Then, the sufficient statistic corresponding to a short-time speaker ID, which is obtained in the processing of Step A4, is read from the sufficient statistic storage section 32, to create one sufficient statistic relating to the short-time speaker by statistical calculation (Step C3). Then, the read sufficient statistic relating to the long-time speaker and the created sufficient statistic relating to the short-time speaker are integrated by statistical calculation, to thereby sequentially create the speaker adaptive models (Step C4). The adaptive model creating means 25 may weight and integrate the sufficient statistic relating to the long-time speaker and the sufficient statistic relating to the short-time speaker based on, for example, the log likelihood of the GMM with respect to the received acoustic feature value, or based on an arbitrary value.

Figure 10:
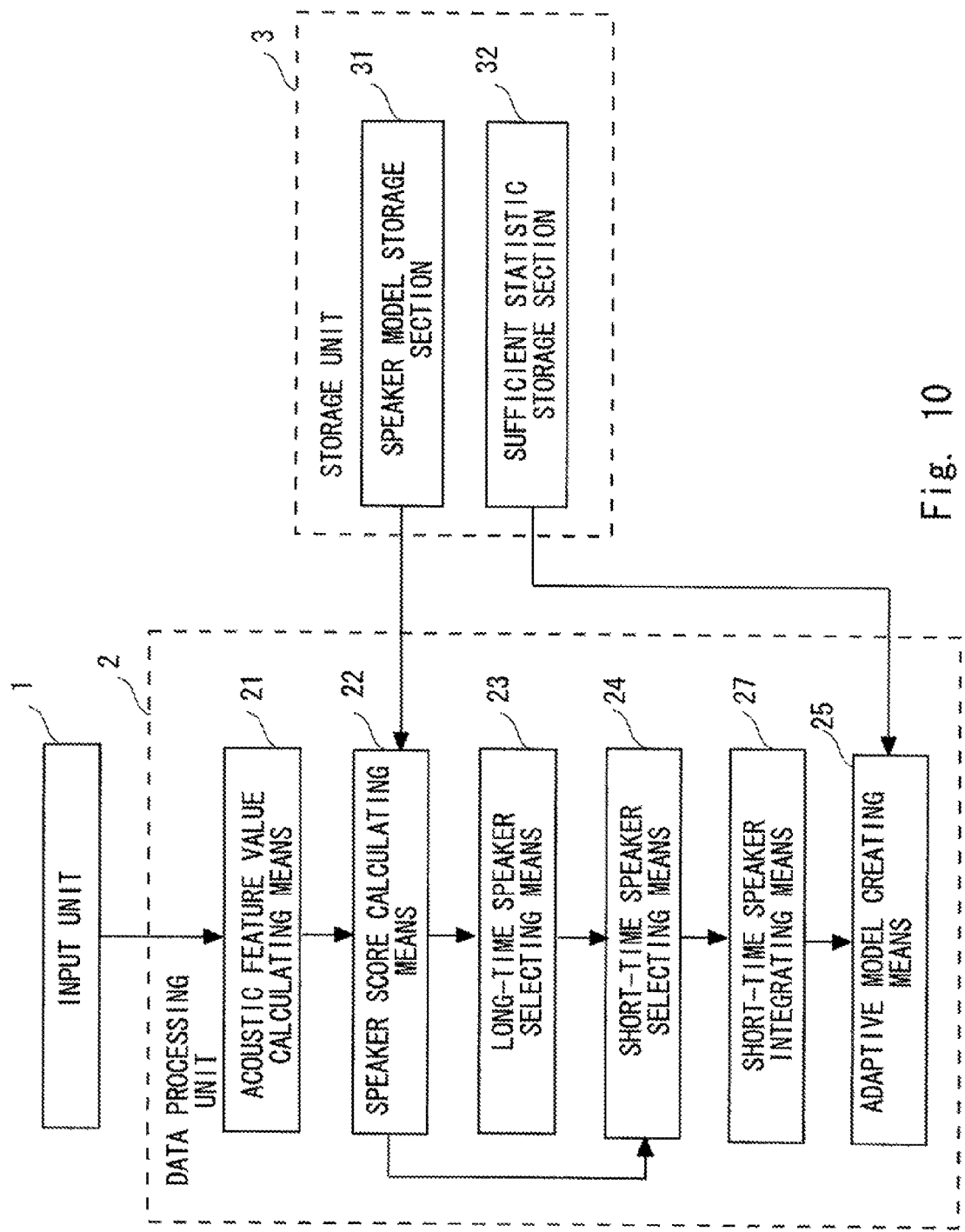
FIG. 10 is a block diagram showing operation of a fifth embodiment of the present invention.

Next, a fifth embodiment of the present invention will be described in detail with reference to the drawings. FIG. 10 is a block diagram showing the configuration of a speaker selecting device according to the present invention.

As shown in FIG. 10, the data processing unit 2 of the fifth embodiment differs from that of the second embodiment in including a short-time speaker integrating means 27 in addition to the configuration of the second embodiment shown in FIG. 3. Note that a device including the storage unit 3, the acoustic feature value calculating means 21, the speaker score calculating means 22, the long-time speaker selecting means 23, and the short-time speaker selecting means 24, which are shown in FIG. 10, may be defined as a speaker selecting device, and a device further including the short-time speaker integrating means 27 and the adaptive model creating means 25 may be defined as a speaker adaptive model creating device.

The short-time speaker integrating means 27 receives the speaker IDs output from the short-time speaker selecting means 24 per short time (e.g. per utterance), and counts occurrences of the speaker IDs while permitting duplication. That is, a histogram representing IDs of speakers that have occurred (a set of a speaker ID and a frequency) is created. Then, the created histogram is output to the adaptive model creating means 25.

Referring next to the flowchart of FIG. 11, the overall operation of the speaker selecting device of this embodiment shown in FIG. 10 will be described in detail.

Figure 11:
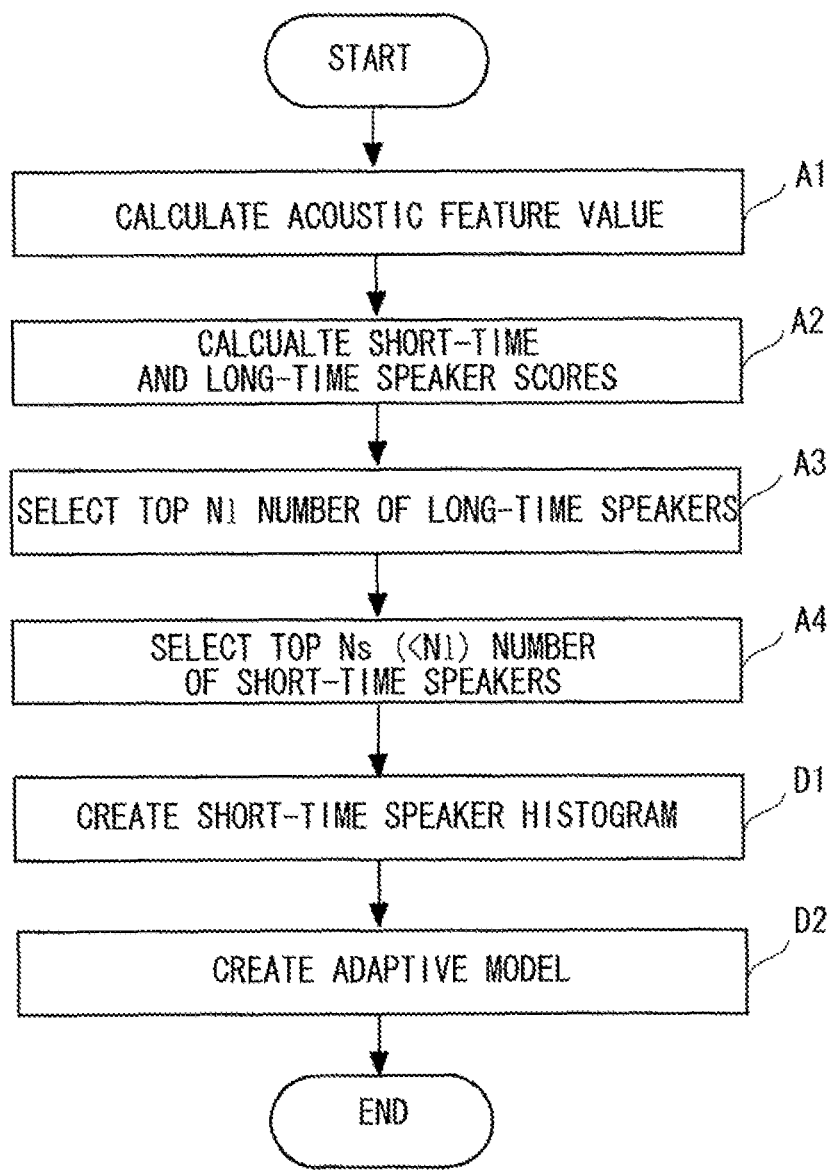
FIG. 11 is a flowchart showing operation of the fifth embodiment of the present invention.

The operations of the acoustic feature value calculating means 21, the speaker score calculating means 22, the long-time speaker selecting means 23, and the short-time speaker selecting means 24 of the fifth embodiment, which are respectively represented by Steps A1, A2, A3, and A4 in FIG. 11, are similar to those of the second embodiment, so the description thereof is omitted.

In the second embodiment, the short-time speaker selecting means 24 selects speakers from among the speakers selected by the long-time speaker selecting means 23, and the adaptive model creating means 25 sequentially creates the speaker adaptive models, while in this embodiment, the short-time speaker integrating means 27 counts the selected speakers per utterance, and creates a histogram representing the speakers (Step D1).

Then, the adaptive model creating means 25 creates only one speaker adaptive model by statistical calculation (Step D2). In this embodiment, the adaptive model creating means 25 weights and integrates, in the statistical calculation, the sufficient statistic based on the frequency of speakers (the frequency of occurrence of speakers) obtained in Step D1. That is, the normalization is performed by placing more weight on the sufficient statistic of the speaker, the frequency of occurrence of which is high.

Next, the effects of the fifth embodiment will be described. In the fifth embodiment, instead of creating a speaker adaptive model per utterance, only one adaptive model is created for a series of conversations or calls, based on the histogram that represents the speakers and is created by counting the speakers selected per utterance. Thus, a processing time required for creating the adaptive model can be reduced.

First Example

Next, an example of the present invention will be described with reference to the drawings. This example corresponds to the first embodiment of the present invention shown in FIG. 1. In this example, a microphone is used as the input unit 1, a personal computer is used as the data processing unit 2, and a magnetic disk unit is used as the data storage unit 3.

The personal computer includes programs functioning as the acoustic feature value calculating means 21, the speaker score calculating means 22, the long-time speaker selecting means 23, and the short-time speaker selecting means 24, respectively, and a central processing unit. Further, the magnetic disk unit stores 3120 speaker models, for example. As in the case of Non Patent Document 1, a 1-state 64-mixture GMM without distinction of the phoneme is used as a speaker model. FIG. 12 shows an example of the form of the speaker model.

In the example shown in FIG. 12, the acoustic feature value calculating means 21, which is implemented by the central processing unit, learns using 40-dimentional voice feature values which include mel-frequency cepstral coefficients (MFCCs) and their rates of change, and holds, in the magnetic disk unit, a mixture weight which is a parameter for defining a GMM, a mean vector ("mean" in FIG. 12), and a variance-covariance matrix ("variance" in FIG. 12) as speaker models.

Assuming that a voice signal of the speaker A is received from the microphone, the central processing unit converts the voice signal into 40-dimentional feature values including mel-frequency cepstral coefficients (MFCCs) and their rates of change. Next, the speaker score calculating means 22 implemented by the central processing unit reads 3120 speaker models from the magnetic disk unit, and calculates speaker scores with respect to the feature values of the speaker A, i.e., the log likelihood of the GMM for all the 3120 speakers. FIG. 13 shows an example of the calculated log likelihood. The central processing unit calculates the log likelihood once per conversation and per utterance.

Figure 14:
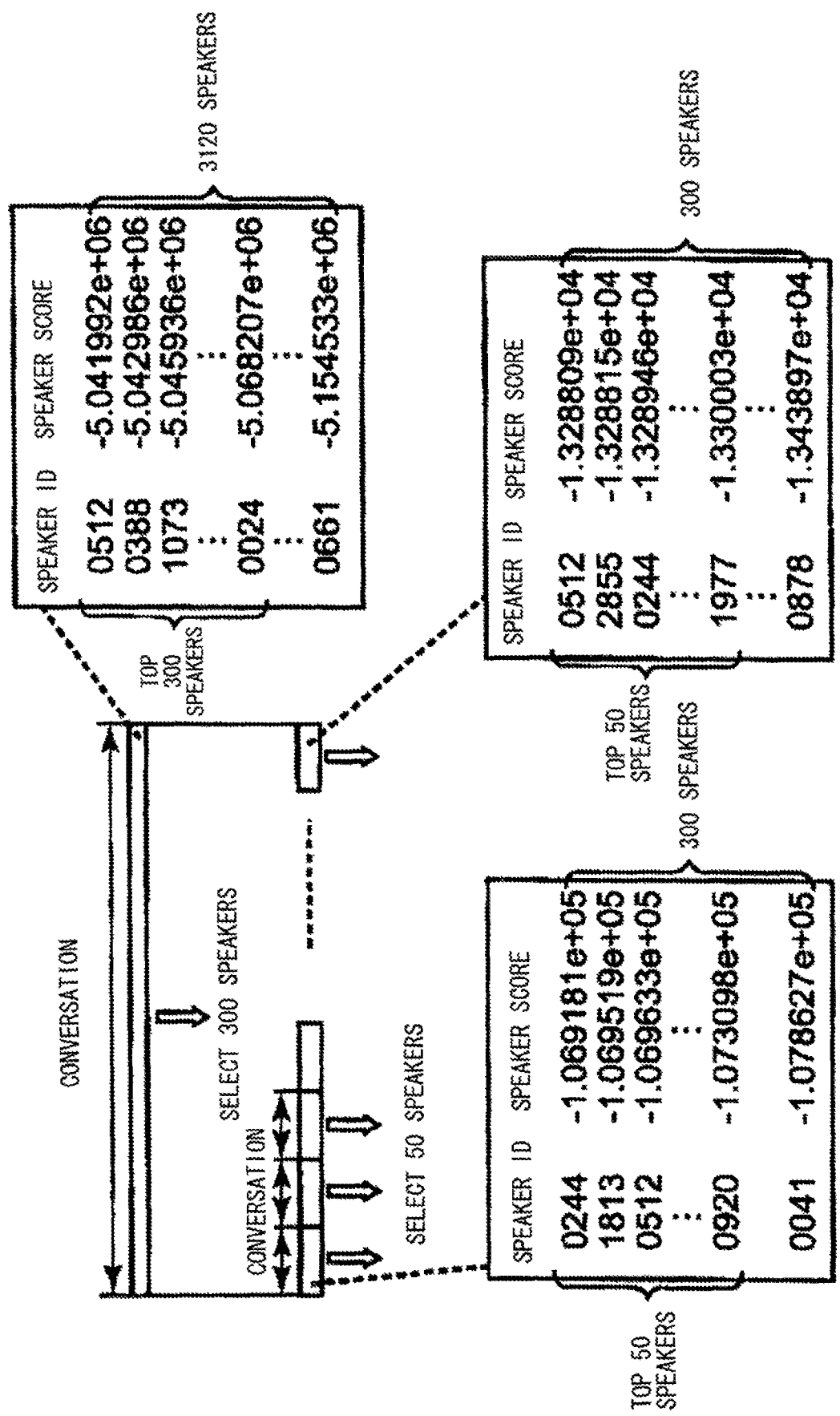
FIG. 14 is an explanatory diagram showing an example of selection of speakers.

Further, the long-time speaker selecting means 23 implemented by the central processing unit compares the calculated 3120 speaker scores to select top 300 speakers having a high speaker score per conversation, and then the short-time speaker selecting means 24 implemented by the central processing unit sequentially selects top 50 speakers having a high speaker score per utterance from among the 300 speakers. FIG. 14 shows an example of the speaker selection.

Note that, though an example corresponding to the first embodiment has been herein described, the second to fifth embodiments can also be carried out using a microphone as the input unit 1, a personal computer as the data processing unit 2, and a magnetic disk unit as the data storage unit 3, in a similar manner as in the above-mentioned example.

INDUSTRIAL APPLICABILITY

The present invention can be applied to such uses as a voice recognition device for converting a voice signal into a text, and a program for causing a computer to implement the voice recognition device. Further, the present invention can be applied to such uses as a speaker adaptive model creating device for improving voice recognition performance by adapting a voice recognition system to the acoustic feature of each utterance of a user, without making the user conscious of it, and a program for causing a computer to implement the speaker adaptive model creating device. Moreover, the present invention can be applied to such uses as a content search device capable of automatically assigning a speaker index to a video content with a voice, and capable of searching contents.

The invention claimed is:

1. A speaker selecting device including a central processing unit comprising:
a speaker model storage means that stores a plurality of speaker models;
an acoustic feature value calculating means that calculates a feature value from received voice signals; and
a speaker score calculating means that calculates a likelihood of each of the plurality of speaker models stored in the speaker model storage means with respect to the feature value calculated by the acoustic feature value calculating means, wherein
the speaker score calculating means calculates a first likelihood and a second likelihood based on the voice signals of two relatively different time lengths,
the speaker score calculating means comprises:
a first selection means that selects speakers corresponding to a predetermined number of speaker models the first likelihood of which is high; and
a second selection means that narrows the speakers selected by the first selection means down to speakers the number of which is smaller than the predetermined number and the second likelihood of which is high, and
the speaker score calculating means sequentially outputs information corresponding the speakers selected by the second selection means.

2. The speaker selecting device according to claim 1, wherein
the speaker score calculating means calculates, as the first likelihood, a long-time likelihood based on a voice signal of a relatively long time, and calculates, as the second likelihood, a short-time likelihood based on a voice signal of a relatively short time,
the first selection means is a long-time speaker selecting means that selects speakers corresponding to a predetermined number of speaker models the long-time likelihood of which is high, and
the second selection means is a short-time speaker selecting means that selects speakers corresponding to speaker models the number of which is smaller than the predetermined number and the short-time likelihood of which is high.

3. The speaker selecting device according to claim 1, wherein
the speaker score calculating means calculates, as the first likelihood, a short-time likelihood based on a voice signal of a relatively short time, and calculates, as the second likelihood, a long-time likelihood based on a voice signal of a relatively long time,
the first selection means is a short-time speaker selecting means that selects speakers corresponding to a predetermined number of speaker models the short-time likelihood of which is high, and
the second selection means is a long-time speaker selecting means that selects speakers corresponding to speaker models the number of which is smaller than the predetermined number and the long-time likelihood of which is high.

4. The speaker selecting device according to claim 2, wherein
the long-time speaker selecting means selects the speakers using the likelihoods calculated by the speaker score calculating means, and a first threshold relating to a predetermined likelihood, and
the short-time speaker selecting means selects the speakers using the likelihoods calculated by the speaker score calculating means, and a second threshold which is a threshold relating to a predetermined likelihood and which is a value equal to or different from the first threshold.

5. The speaker selecting device according to claim 2, further comprising an utterance dependence storage means that stores data indicating a temporal dependence between utterances, wherein the speaker score calculating means calculates the likelihoods by reflecting the data stored in the utterance dependence storage means.

6. A speaker adaptive model creating device comprising:
a speaker selecting device according to claim 1; and
an adaptive model creating means that creates a speaker adaptive model by statistical calculation based on sufficient statistics corresponding to speakers selected by the speaker selecting device.

7. A speaker adaptive model creating device comprising:
a speaker selecting device according to claim 2;
a means that creates one sufficient statistic relating to a long-time speaker by statistical calculation, from sufficient statistics respectively corresponding to a plurality of speakers selected by a long-time speaker selecting means;
a means that creates one sufficient statistic relating to a short-time speaker by statistical calculation, from sufficient statistics respectively corresponding to a plurality of speakers selected by a short-time speaker selecting means; and
an adaptive model creating means that integrates, by statistical calculation, the sufficient statistics calculated by each of the means, to thereby create a speaker adaptive model.

8. A speaker adaptive model creating device comprising:
a speaker selecting device according to claim 2;
a short-time speaker integrating means that calculates a frequency of occurrence of speakers selected by a short-time speaker selecting means; and
an adaptive model creating means that creates one speaker adaptive model by weighting and integrating sufficient statistics based on the frequency of occurrence of speakers.

9. A speaker selecting method to be executed by a computer comprising:
storing a plurality of speaker models in advance; calculating a feature value from received voice signals;
calculating a first likelihood and a second likelihood based on the voice signals of two relatively different time lengths, for each of the plurality of speaker models stored with respect to the calculated feature value and selecting speakers using the calculated likelihood, the method comprising:
selecting speakers corresponding to a predetermined speaker models the first likelihood of which is high;
narrowing speakers selected as the speakers corresponding to the predetermined number of speaker models the first likelihood of which is high, down to speaker models the number of which is smaller than the predetermined number and the second likelihood of which is high; and
sequentially outputting information corresponding to speakers narrowed down to the speaker models the number of which is smaller than the predetermined number and the second likelihood of which is high.

10. The speaker selecting method according to claim 9, wherein
in calculating the first likelihood and the second likelihood, a long-time likelihood based on a voice signal of a relatively long time is calculated as the first likelihood, and a short-time likelihood based on a voice signal of a relatively short time is calculated as the second likelihood,
in selecting the speakers corresponding to the predetermined number of speaker models the first likelihood of which is high, speakers corresponding to a predetermined number of speaker models the long-time likelihood of which is high are selected, and
in narrowing down to the speaker models the second likelihood of which is high, speakers the number of which is smaller than the predetermined number and the short-time likelihood of which is high are selected.

11. The speaker selecting method according to claim 9, wherein
in calculating the first likelihood and the second likelihood, a short-time likelihood based on a voice signal of a relatively short time is calculated as the first likelihood, and a long-time likelihood based on a voice signal of a relatively long time is calculated as the second likelihood,
in selecting the speakers corresponding to the predetermined number of speaker models the first likelihood of which is high, speakers corresponding to a predetermined number of speaker models the short-time likelihood of which is high are selected, and
in narrowing down to the speaker models the second likelihood of which is high, speakers corresponding to speaker models the number of which is smaller than the predetermined number and the long-time likelihood of which is high are selected.

12. The speaker selecting method according to claim 10, wherein
in selecting the speakers corresponding to the speaker models the long-time likelihood of which is high, the speakers are selected using the likelihoods calculated when the first likelihood and the second likelihood are calculated, and a first threshold relating to a predetermined likelihood, and
in selecting the speakers corresponding to the predetermined number of speaker models the short-time likelihood of which is high, the speakers are selected using the likelihoods calculated when the first likelihood and the second likelihood are calculated, and a second threshold which is a threshold relating to a predetermined likelihood and which is a value equal to or different from the first threshold.

13. The speaker selecting method according to claim 10, wherein
data indicating a temporal dependence between utterances is stored in advance, and
in calculating the first likelihood and the second likelihood, the likelihoods are calculated by reflecting the stored data indicating the temporal dependence between utterances.

14. A non-transitory computer readable storage medium for recording a speaker selecting program for causing a computer which performs a speaker selection step for selecting speakers using speaker models stored in a speaker model storage means that stores a plurality of speaker models, to execute:
a speaker score calculation step for calculating a first likelihood and a second likelihood based on the voice signals of two relatively different time lengths;
a first selection step for selecting speakers corresponding to a predetermined number of speakers the first likelihood of which is high;
a second selection step for narrowing the speakers selected in the first selection step down to speaker models the number of which is smaller than the predetermined number and the second likelihood of which is high; and
a step for sequentially outputting information corresponding to the speakers selected in the second selection step.

15. The non-transitory computer readable storage medium for recording a speaker selecting program according to claim 14, wherein the speaker score calculation step includes causing the computer to calculate, as the first likelihood, a long-time likelihood based on a voice signal of a relatively long time, and to calculate, as the second likelihood, a short-time likelihood based on a voice signal of a relatively short time, the first selection step includes causing the computer to execute long-time selection step for selecting speakers corresponding to a predetermined number of speaker models the long-time likelihood of which is high, and the second selection step includes causing the computer to execute a short-time selection step for selecting speakers corresponding to speaker models the number of which is smaller than the predetermined number and the short-time likelihood of which is high.

16. The non-transitory computer readable storage medium for recording a speaker selecting program according to claim 14, wherein the speaker score calculation step includes causing the computer to calculate, as the first likelihood, a short-time likelihood based on a voice signal of a relatively short time, and to calculate, as the second likelihood, a long-time likelihood based on a voice signal of a relatively long time, the first selection step includes causing the computer to execute a short-time selection step for selecting speakers corresponding to a predetermined number of speaker models the short-time likelihood of which is high, and the second selection step includes causing the computer to execute a long-time selection step for selecting speakers corresponding to speaker models the number of which is smaller than the predetermined number and the long-time likelihood of which is high.

17. The non-transitory computer readable storage medium for recording a speaker selecting program according to claim 15, wherein the long-time speaker selection step includes causing the computer to select speakers using the likelihoods calculated in the speaker score calculation step, and a first threshold relating to a predetermined likelihood, and the short-time speaker selection step includes causing the computer to select speakers using the likelihoods calculated in the speaker score calculation step, and a second threshold which is a threshold relating to a predetermined likelihood and which is a value equal to or different from the first threshold.

18. The non-transitory computer readable storage medium for recording a speaker selecting program according to claim 15, wherein the speaker score calculation step includes causing a computer accessible to an utterance dependence storage means that stores data indicating a temporal dependence between utterances, to calculate a likelihood by reflecting the stored data indicating the temporal dependence between utterances.

19. A non-transitory computer readable storage medium for recording a speaker adaptive model creating program for causing a computer to execute:

step in a speaker selecting program according to claim 14; and an adaptive model creating step for creating a speaker adaptive model by statistical calculation based on sufficient statistics corresponding to speakers selected in a second selection step.

20. A non-transitory computer readable storage medium for recording a speaker adaptive model creating program for causing a computer to execute:

step in a speaker selecting program according to claim 15;

a step for creating one sufficient statistic relating to a long-time speaker by statistical calculation, from sufficient statistics respectively corresponding to a plurality of speakers selected in a long-time speaker selection step;

a step for creating one sufficient statistic relating to a short-time speaker by statistical calculation, from sufficient statistics respectively corresponding to a plurality of speakers selected in a short-time speaker selection step; and an adaptive model creating step for creating a speaker adaptive model by integrating the sufficient statistics calculated in the step for creating the sufficient statistics by statistical calculation.

21. A non-transitory computer readable storage medium for recording a speaker adaptive model creating program for causing a computer to execute:

step in a speaker selecting program according to claim 15;

a short-time speaker integrating step for calculating a frequency of occurrence of speakers selected in a short-time speaker selection step; and an adaptive model creating step for creating one speaker adaptive model by weighting and integrating sufficient statistics based on the frequency of occurrence of speakers.

* * * * *